US008736616B2

(12) United States Patent
Havaldar et al.

(10) Patent No.: US 8,736,616 B2
(45) Date of Patent: May 27, 2014

(54) COMBINING MULTI-SENSORY INPUTS FOR DIGITAL ANIMATION

(75) Inventors: Parag Havaldar, Cerritos, CA (US); Josh Wills, Manhattan Beach, CA (US); Demian Gordon, Culver City, CA (US); Josh Ochoa, Hermosa Beach, CA (US); Jianxia Xue, Oxford, MS (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 223 days.

(21) Appl. No.: 12/883,074

(22) Filed: Sep. 15, 2010

(65) Prior Publication Data

US 2011/0091070 A1 Apr. 21, 2011

Related U.S. Application Data

(60) Provisional application No. 61/242,733, filed on Sep. 15, 2009.

(51) Int. Cl.
*G06T 13/00* (2011.01)

(52) U.S. Cl.
USPC .............................. 345/473; 345/419; 382/103

(58) Field of Classification Search
CPC .......... G06T 13/40; G06T 13/00; G06T 13/80
USPC .................. 345/473, 419; 382/103
See application file for complete search history.

(56) References Cited

U.S. PATENT DOCUMENTS

| 7,009,561 | B2 * | 3/2006 | Menache et al. | 342/463 |
| 7,068,277 | B2 * | 6/2006 | Menache | 345/473 |
| 7,089,148 | B1 * | 8/2006 | Bachmann et al. | 702/151 |
| 7,542,040 | B2 * | 6/2009 | Templeman | 345/474 |
| 7,931,604 | B2 * | 4/2011 | Even Zohar et al. | 600/595 |
| 2003/0095186 | A1 * | 5/2003 | Aman et al. | 348/162 |
| 2006/0024505 | A1 | 2/2006 | Keh et al. | |
| 2006/0071934 | A1 * | 4/2006 | Sagar et al. | 345/473 |
| 2007/0200854 | A1 * | 8/2007 | Gordon et al. | 345/474 |
| 2008/0024505 | A1 * | 1/2008 | Gordon et al. | 345/473 |
| 2008/0025569 | A1 * | 1/2008 | Gordon et al. | 382/103 |
| 2008/0170750 | A1 * | 7/2008 | Gordon | 382/103 |
| 2008/0317313 | A1 * | 12/2008 | Goddard et al. | 382/131 |
| 2010/0110169 | A1 * | 5/2010 | Zerkin | 348/77 |
| 2010/0309209 | A1 * | 12/2010 | Hodgins et al. | 345/473 |

FOREIGN PATENT DOCUMENTS

| EP | 1876412 A1 * | 1/2008 |
| WO | WO 2007127743 A2 * | 11/2007 |

OTHER PUBLICATIONS

V. Lympourides, "Fully Wireless, Full Body 3-D Motion Capture for Improvisational Performances", Apr. 5, 2009, SIGCHI Workshop on Whole Body Interaction, Boston MA.*

Tautges et al. "Tracking of Human Body Motions Using Very Few Inertial Sensors", Published 2008.*

* cited by examiner

*Primary Examiner* — Kimbinh T Nguyen
(74) *Attorney, Agent, or Firm* — Procopio, Cory, Hargreaves & Savitch, LLP

(57) ABSTRACT

Animating digital characters based on motion captured performances, including: receiving sensory data collected using a variety of collection techniques including optical video, electro-oculography, and at least one of optical, infrared, and inertial motion capture; and managing and combining the collected sensory data to aid cleaning, tracking, labeling, and re-targeting processes. Keywords include Optical Video Data and Inertial Motion Capture.

19 Claims, 5 Drawing Sheets

COMBINING MULTI-SENSORY INPUTS FOR DIGITAL ANIMATION

CROSS-REFERENCE TO RELATED APPLICATIONS

This application claims the benefit of priority under 35 U.S.C. §119(e) of co-pending U.S. Provisional Patent Application No. 61/242,733, filed Sep. 15, 2009, entitled "Combining Optical Video Data and Inertial Motion Capture system." The disclosure of the above-referenced application is incorporated herein by reference.

BACKGROUND

1. Field of the Invention

The present invention relates to motion capture, and more specifically, to combining multi-sensory inputs for digital animation.

2. Background

Motion capture systems are used to capture movements of actors and/or objects and map them onto computer-generated objects as a way of animating them. These systems are often used in the production of motion pictures and video games for creating a digital representation of actors and/or objects for use as source data to create a computer graphics ("CG") animation. In a typical system, an actor wears a suit having markers attached at various locations (e.g., small reflective markers are attached to the body and limbs). Appropriately placed digital cameras then record the actor's body movements in a capture volume from different angles while the markers are illuminated. The system later analyzes the images to determine the locations (e.g., spatial coordinates) of the markers on the actor's suit in each frame. By tracking the locations of the markers, the system creates a spatial representation of the markers over time and builds a digital representation of the actor in motion. The motion is then applied to a digital model in virtual space, which may be textured and rendered to produce a complete CG representation of the actor and/or the performance. This technique has been used by special effects companies to produce realistic animations in many popular movies.

SUMMARY

In one implementation, a method of animating digital characters based on motion captured performances is disclosed. The method includes: receiving sensory data collected using a variety of collection techniques including optical video, electro-oculography, and at least one of optical, infrared, and inertial motion capture; and managing and combining the collected sensory data to aid cleaning, tracking, labeling, and re-targeting processes.

In another implementation, a combine motion capture system is disclosed. The system includes: a labeling module; a tracking module; a cleaning module; a re-targeting module; and an input management module configured to receive sensory data collected using a variety of collection techniques including optical video, electro-oculography, and at least one of optical, infrared, and inertial motion capture, the input management module managing and combining the received sensory data to produce outputs that guide the labeling module, the tracking module, the cleaning module, and the re-targeting module.

In a further implementation, a non-transitory tangible storage medium storing a computer program for animating digital characters based on motion captured performances is disclosed. The computer program includes executable instructions that cause a computer to: receive sensory data collected using a variety of collection techniques including optical video, electro-oculography, and at least one of optical, infrared, and inertial motion capture; and manage and combine the collected sensory data to aid cleaning, tracking, labeling, and re-targeting processes.

Other features and advantages of the present invention will become more readily apparent to those of ordinary skill in the art after reviewing the following detailed description and accompanying drawings.

DETAILED DESCRIPTION

Figure 1:
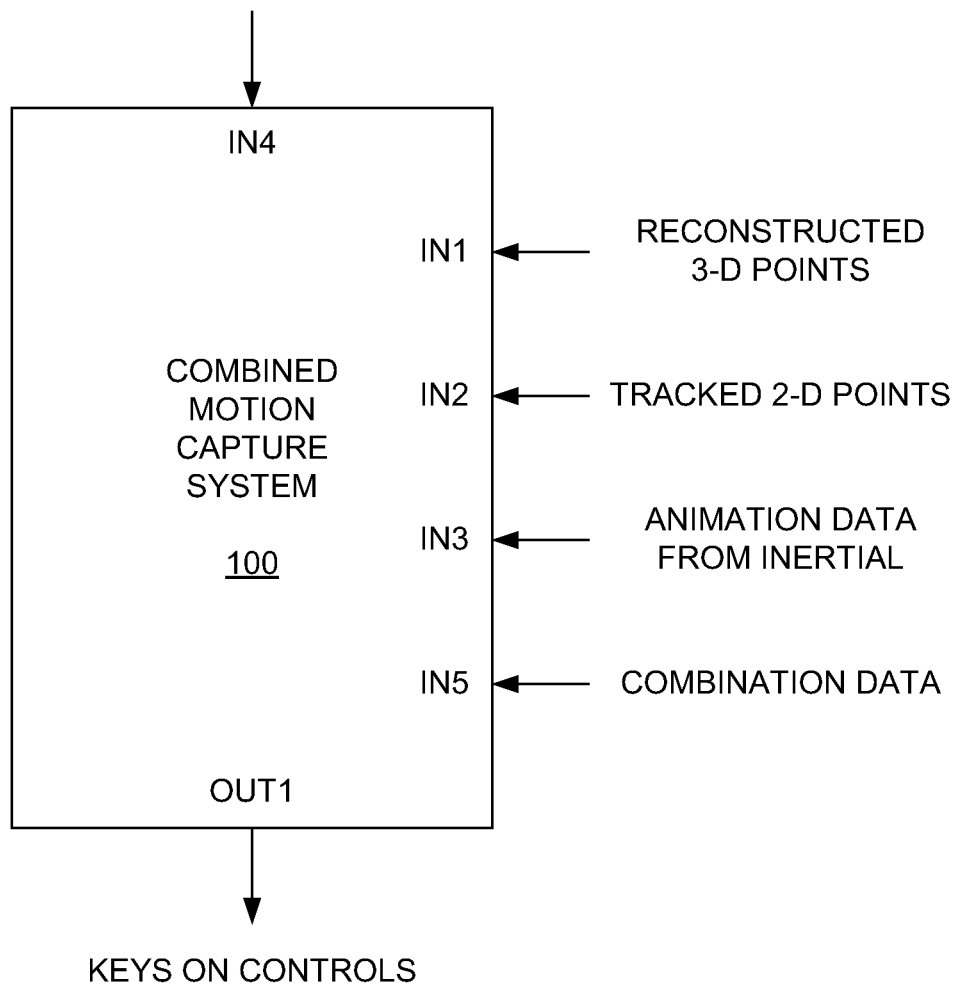
FIG. 1 shows a combined motion capture system in accordance with one implementation of the present invention.

Certain implementations as disclosed herein provide for combining multi-sensory inputs for digital animation. After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

Various implementations include techniques for animating digital characters (including body, face and eyes) based on captured performances. The techniques include using a variety of sensory data either individually or in combination. For example, the sensory data is collected using motion capture systems, traditional video, electro-oculography systems, and inertial motion capture systems, which are well-suited to capture actor performances and re-target them onto digital characters in a variety of production scenarios. In this implementation, different tools for capturing actor performances and object structure and motion are combined, and the data is brought together in creating a representation of the performances, such as in animating digital characters in an animated movie. Thus, the tools are well suited to capture actor performances and re-target them onto digital characters in a variety of production scenarios.

In one implementation, various motion capture techniques are combined. In one example, motion capture sessions performed in different capture volumes are combined. A complete large volume, high footprint capture can be performed on a sound stage where the actors wear motion capture suits with optical reflective markers as well as facial reflective markers. The captured data is automatically labeled, cleaned and re-targeted on digital characters. The resulting animations use controls familiar to artists so that they can easily augment animations to the artistic needs of the production. This is used to capture, process, and re-target both body and face simultaneously in, for example, a large 55×55×25-foot volume on many production projects. A low volume, low footprint, on-set capture can be performed on one or multiple video streams. This process uses coded and hence identifiable markers that actors wear on their body suits and pen marks on the face. These markers are identified and tracked in video. The tracked 2D data is then analyzed and re-targeted onto a digital character. This has been used to capture actors on set, under set lighting with minimal impact to the project at capture time, but has yielded automatically/semi-automatically labeled, tracked and re-targeted animation on digital characters.

In another example, it is sometimes undesirable to use a traditional motion capture system when a camera placement is difficult or impossible due to set constraints (e.g., set lighting). In such a situation, inertial systems can be used wherein the systems produce accurate relative animation of body parts, however such systems have a drawback of not being able to accurately keep track of the absolute position of the actor. The absolute position, typically referred to as a root of the actor, drifts over time and as a result, the actor position in the 3-D real-world does not match the character's position in the 'graphic' world. This undesirable effect is a drawback of the operation of the inertial systems. However, this undesirable effect does cause problems in lining up actors on digital sets. To solve this problem, other sensory inputs such as optical and acoustic inputs may be used in combination with inertial to automate the solution and solve for the absolute location of the digital character. Accordingly, multiple streams of sensory data are effectively combined to produce good animations using a combination of inertial and video systems, or inertial and acoustic systems. In one implementation, the video-based system solves for the root, while the inertial system provides local animations around the root.

In one implementation of a combined motion capture system, following inputs can be provided: (a) reconstructed 3-D points that come from traditional motion capture systems (in the large volume example); (b) tracked 2-D entities from multiple video cameras (in the low foot print on set case); (c) animation data from inertial systems not synchronized in position due to drift issues; or (d) combinations there of. Outputs produced from the system include final animations for body and face by providing keys on controls familiar to animators on the digital character rigs. Further, the combined system also can include an off-line calibration step where actors go through a range of motion movements for the body and face. These range of motion movements are used to guide the labeling, tracking and re-targeting steps.

Although the underlying techniques used to clean, track, and re-target data sets are substantially similar in most cases, the processing steps may differ depending on the type of input data used. That is, whether the input data is in 3-D, 2-D, or a combination there of.

In one example, a common underlying technique for facial processing is the Facial Action Coding System (FACS), which defines a list of legal action units for a human face and specifies constraints on the facial muscles of the face. Data obtained from optical systems and electro-oculography systems are combined to aid in the facial processing. However, in the future, data obtained from optical systems can be combined with data from other systems for facial processing.

In another example, a common underlying technique for body processing is Inverse Kinematics (IK), which provides a mathematical formulation for legal bone movements for a human body based on the degrees of freedom assigned on bone joints. Data obtained from optical systems and inertial systems are combined to aid in the body processing.

In one implementation, when the input is a plurality of 3-D data points, the data points are defined as unlabeled points in 3-D space that correspond to the movements of multiple actors in a volume. In this case, the body and facial data points are broken into two sets (may include data corresponding to multiple people).

The body markers are labeled, tracked, cleaned and then re-targeted. Tools can be used to automatically label the first frame (body T-Pose) based on coded alignment of markers on a person. The markers in the subsequent frames are labeled by predictions based on IK models. Once markers are labeled and tracked in substantially all frames, a re-targeting step based on calibration data generates animation keys on the bones of the digital character.

The facial data is processed in a gross stabilization process wherein the head markers are used to generate a transform to map the facial markers to a neutral space. The intent is to have facial markers only show motion due to facial expression and not due to body movements. The result is then processed through two simultaneous processes, a fine stabilization process and a labeling process. The fine stabilization process uses "learned" FACS-based action units, which further locks down any gross movement in the facial markers. The labeling process labels all the facial markers. The tracked and labeled markers are then processed through a retargeting step (referred to as a FACS solver), wherein the incoming expression is broken into a weighted basis set of FACS action units. These weights are used as keys on facial poses derived on a digital face.

In another implementation, at least one video camera is used to capture the body and face such that the input is video including a plurality of 2-D data points. In the body capture case, self-identifying optical markers are used, wherein each marker is coded with a unique ID. The code can be detected visually using image processing logic. Once detected, location and orientations of the markers in the image are calculated. The 2-D locations of these markers are identified in each frame for all cameras. The 2-D locations are then input to a multi-camera IK solver system. This system takes as input the 2-D points and a 3-D skeleton model calibrated to the specific actor with 3-D offset markers attached to the bones. Next the position and/or orientation of the skeleton bones and offset markers are computed based on optimization techniques so as to substantially reduce the error between the locations of the projected markers and the actual 2-D data observed simultaneously in the multiple cameras.

In the facial capture case, a facial motion capture solver that works in the "image" space instead of the "world" space is used. That is, the solver requires only the 2-D locations of markers in a single camera to solve for both the orientation and expression for an actor. The solver does this by solving first for an estimate of the position of the head using a model of the actor in a neutral pose, then solving for the expression using the FACS system.

In another implementation of a combined motion capture system, data obtained from following processes are combined to provide output results: (a) 3-D body marker positions obtained from T-pose labeler; (b) 3-D body marker positions obtained from kinematic labeling and cleaning; (c) 3-D facial marker positions obtained from stabilization of facial data; (d) 3-D facial marker positions obtained from facial labeling and cleaning; (e) 3-D facial marker positions obtained by selecting a best T-pose; (f) 3-D facial marker positions obtained from FACS-based facial retargeting; (g) 3-D facial marker positions obtained from tuning animation; (h) 2-D marker positions obtained from video-based facial and body tracking; (i) 2-D marker positions obtained from video-based facial animation solver; and (j) 2-D marker positions obtained from video-based body animation solver. Each of the above listed applications is described below.

For the T-pose labeler process (a), the captured body and face data is output as a cloud of 3-D marker points on a frame-by-frame basis. Initially, the actors stand in a T-pose position on the first frame. Then, given a number of unidentified markers on the first frame and with the knowledge that the actors are in a T-pose position, the T-pose labeler identifies each person in the capture volume based on statistical marker distributions and labels each marker on each person on this first frame. This process has a huge time saving impact since the boot strapping of all labeling markers in the first scene occurs automatically.

For the kinematic labeling and cleaning process (b), once the markers are labeled in the first T-pose frame, the markers need to be labeled in all frames. That is, the actors act in conditions such as changing positions with respect to cameras, interacting with each other, undergoing complex motions such as acrobatics, rolling on the floor, and other similar acts. This changing of positions may cause many markers to get occluded from time to time. The kinematic labeling process uses inverse body kinematics to predict the locations of markers, label them and ensure that the markers are moving according to human body motion. Moreover, the kinematic labeling and cleaning step uses probabilistic model along with kinematic models to reduce noise and obtain a more reliable/labeled marker data set that can be used for labeling.

For the stabilization of facial data process (c), the motion captured facial markers are often moving with the body and changing relative positions due to facial expressions. For facial re-targeting purposes, these markers are stabilized to a normalized space (i.e., no gross movements) and then labeled. Although this process may be perceived as being accomplished easily by computing a transform per frame that locks the head to a normalized position, it may involve more complex computations. For example, since the markers used for transformation may themselves be moving, the stabilization process may cause additional noise. In this case, facial expression models based on the FACS may be used to get good stabilized data.

For the facial labeling and cleaning process (d), accomplishes the labeling task, once the data is stabilized. However, this process may need to work in conjunction with the stabilization process itself because the facial marker data captured in a large volume has many problems including high signal to noise ratio, gaps in markers due to faces being occluded. This process uses a library of generic facial models based on the FACS to generate clean, high signal-to-noise ratio (SNR), labeled data.

For the selection of a best T-pose process (e), a good T-pose is searched to provide correct operation of facial re-targeting. In production, markers may be attached to the actors on different days causing markers to go on different spots and thus making neutral faces look different from day to day. Although the actors are directed to perform T-poses at the beginning and end of each shot, the neutral faces of the actors often look different depending on facial muscle tension, mood, and actor fatigue. The selection of a best frame for a T-pose often depends on the selection of a retargeting process. Accordingly, the least squares error best T-pose is selected based on a variety of calibration dialogues performed each day that markers are attached to the actors.

The FACS-based facial retargeting process (f) is an optimization process that receives stabilized, cleaned, and labeled data (using some of the above listed processes) and a facial expression model to generate non-zero weighting values for triggered FACS poses. Although there are other systems available that perform principal component analysis (PCA) or similar statistical analysis, the FACS-based optimization process produces values that are amenable for post modification by animators. This allows the animators in the loop to either control the solutions to output or easily work with the obtained solutions.

The tuning animation process (g) involves tuning retarget animation that did not produce desired output. This may be due to varying marker placements, or actors might not have acted with as much intensity or even less intensity, or perhaps the facial rig that is being used for the retargeting doesn't work as well with the data. In such cases, animators go to specific frames and readjust solutions and the system works backwards, recalibrates the input so that the solution is as desired on the specific frames. The recalibrated input is then applied to all frames to produce a more desired and artist directed animation.

The video-based facial and body tracking application (h) is a platform-independent application that can be used on or off set. The video-based facial and body tracking application provides a software framework that allows a variety of tracking engines to be used in a unified environment where an artist can choose the tracking method best for the specific marker and frame-range; character specific marker sets and models that can be used to automatically label points after a few seed markers are identified. The video-based facial and body tracking application also provides marker specific plug-ins that aid in detecting and refining marker locations for a variety of different markers, including facial dots, crash test markers, and self-identifying markers that can be used to find both the identity and orientation of a marker in a single image. The video-based facial and body tracking application further provides an on-set camera calibration including location, orientation and lens properties. For the on-set camera calibration process, a small calibration object is placed at a known location and the image coordinates of markers are identified and the camera is calibrated relative to this known location. This process also can be used in coordination with a traditional motion capture system to get the camera aligned with the system.

The video-based facial animation solver (i) includes a head pose solver, a FACS solver, and a control utility. The head pose solver estimates the position and pose of the character's head from a set of markers tracked in 2-D. This is done by first estimating which of the markers are in a position consistent with the actor in a neutral pose. The position and pose of the head is then estimated using these markers. The FACS solver calculates the expression by evaluating the image positions of the markers on the 3-D model in the position and pose estimated in the previous step. This is done by estimating where the 3-D model points project into the image and comparing how closely this fits the tracked marker locations. The control utility allows the artist to control the influence of individual markers on the position and pose estimation.

The video-based body animation solver includes a skeleton root solver and a bone orientation solver. The skeleton root solver computes the location of the body skeleton in 3-D based on tracked or self-identified root marker positions in the video sequence(s). The root is computed using an objective function that substantially reduces the error between the tracked data and the locations of skeleton root markers projected into the camera. The bone orientation solver computes orientation of the bones on a skeleton based on tracked or self-identified body marker positions in the video sequence (s). The solving is done per chain of bones, wherein a human has five chains on the skeleton—spine, left arm, right arm, left leg, and right leg. The bone orientations are computed using an objective function that substantially reduces the error between the tracked data and the locations of skeleton body markers projected into the camera.

FIG. 1 shows a combined motion capture system 100 in accordance with one implementation of the present invention. In the illustrated implementation of FIG. 1, the combined system 100 receives at least one of reconstructed 3-D points (IN1), tracked 2-D entities (IN2), animation data (IN3), combined data (IN5), and a range of motion movements for the body and face (IN4). The reconstructed 3-D points are received from traditional motion capture systems, usually in large capture volume cases. The tracked 2-D entities are received from multiple video cameras in low foot print cases. The animation data is received from inertial systems that are not synchronized in position due to drift issues. The combination data includes some combinations of the reconstructed 3-D points, the tracked 2-D entities, and the animation data. The combined system 100 also receives an output of a range of motion movements resulting from an off-line calibration step where actors go through a range of motion movements for the body and face. The outputs produced from the system include final animations for body and face by providing keys on controls familiar to animators on the digital character rigs.

Figure 2:
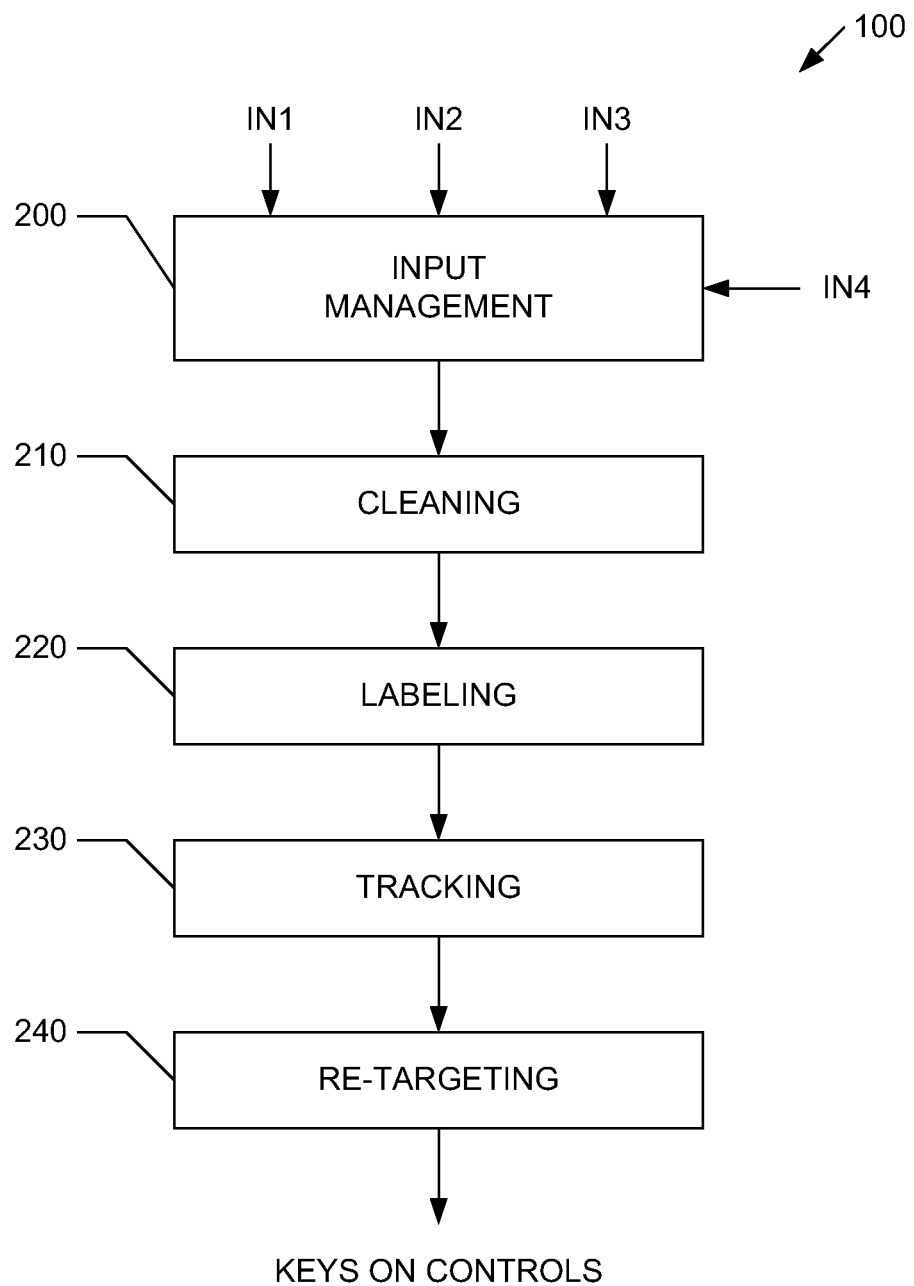
FIG. 2 shows various modules constituting the combined motion capture system in accordance with one implementation of the present invention.

FIG. 2 shows various modules constituting the combined motion capture system 100 in accordance with one implementation of the present invention. In the illustrated implementation of FIG. 2, the combined system 100 is shown to include an input management module 200, a cleaning module 210, a labeling module 220, a tracking module 230, and a re-targeting module 240. Although the modules 210, 220, 230, 240 are shown in a particular order, the processing of the data points by the modules can be in any order.

The input management module 200 receives inputs IN1, IN2, IN3, IN4, IN5, and manages and combines the inputs to produce outputs to guide the subsequent modules 210, 220, 230, 240. For example, when the input is a plurality of 3-D data points, the data points are defined as unlabeled points in 3-D space that correspond to the movements of multiple actors in a volume. In this case, the body and facial data points are broken into two sets (may include data corresponding to multiple people). The body markers are labeled by the labeling module 220, tracked by the tracking module 230, cleaned by the cleaning module 210, and then re-targeted by the re-targeting module 240.

Figure 3A:
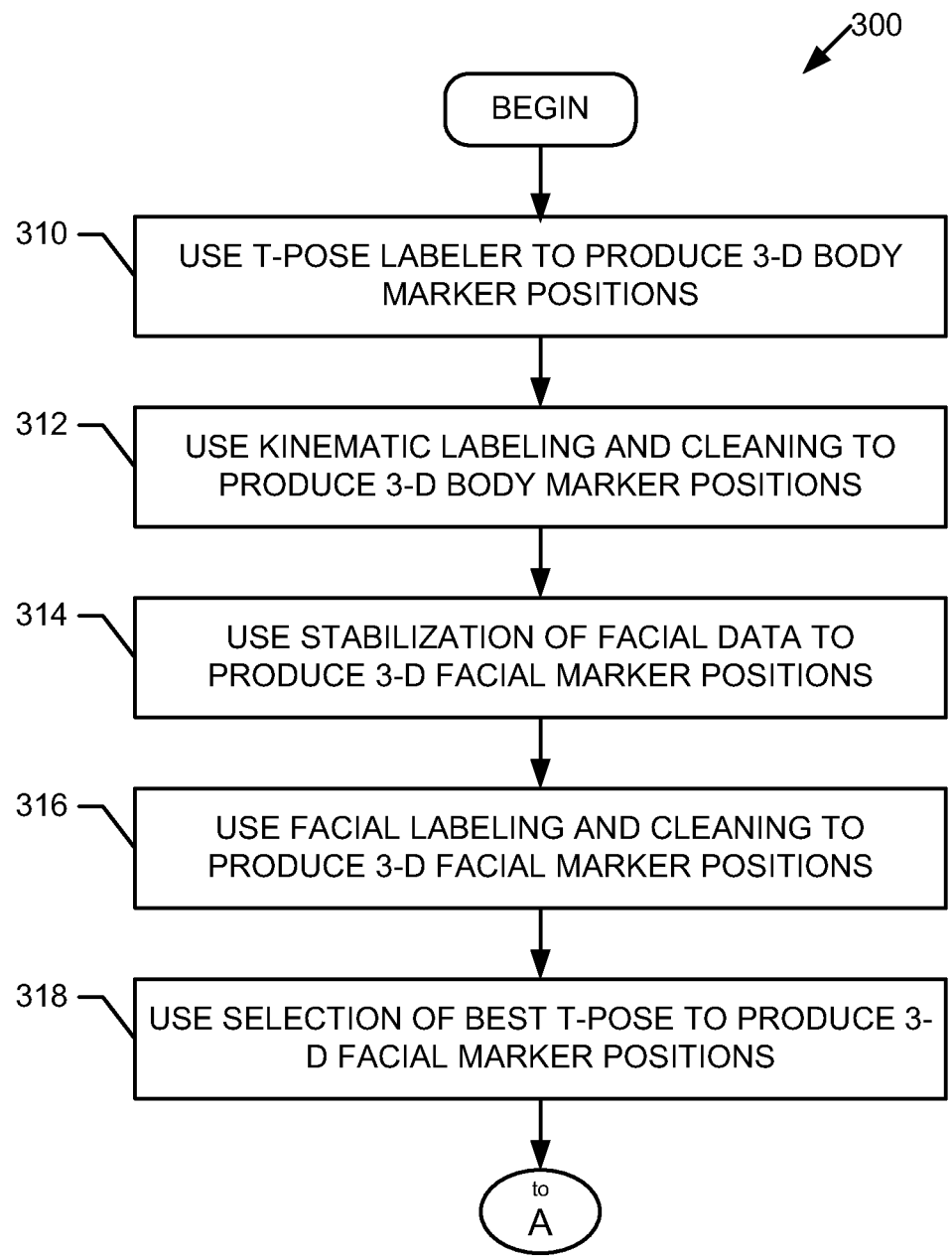
FIGS. 3A and 3B form a flowchart illustrating a technique for combining multi-sensory inputs in accordance with one implementation of the present invention.
Figure 3B:
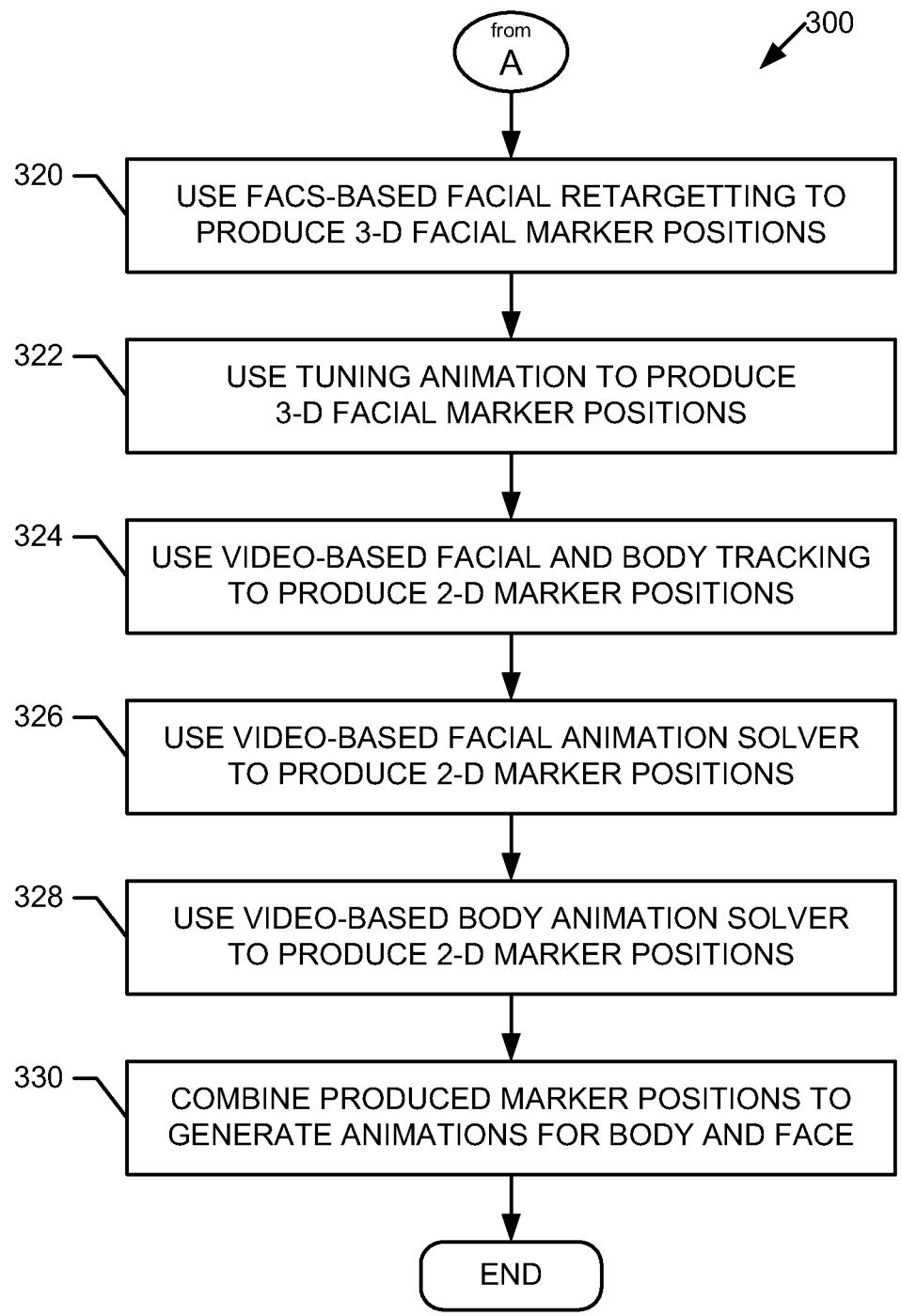

FIGS. 3A and 3B form a flowchart 300 illustrating a technique for combining multi-sensory inputs for digital animation in accordance with one implementation of the present invention. In the illustrated implementation of FIGS. 3A and 3B, a series of processes are executed and combined to generate animations for body and face. In FIG. 3A, the 3-D body marker positions are obtained, at box 310, using T-pose labeler. The 3-D body marker positions are obtained, at box 312, using kinematic labeling and cleaning. The 3-D facial marker positions are obtained, at box 314, using stabilization of facial data. The 3-D facial marker positions are obtained, at box 316, using facial labeling and cleaning. The 3-D facial marker positions are obtained, at box 318, by selecting a best T-pose. In FIG. 3B, the 3-D facial marker positions are obtained, at box 320, using FACS-based facial retargeting. The 3-D facial marker positions are obtained, at box 322, using tuning animation. The 2-D marker positions are obtained, at box 324, using video-based facial and body tracking. The 2-D marker positions are obtained, at box 326, using video-based facial animation solver. The 2-D marker positions are obtained, at box 328, using video-based body animation solver. The produced marker positions are managed and combined, at box 330, to generate the animations for body and face. However, as discussed above, it should be noted that the data obtained from optical systems and electro-oculography systems are combined to aid in the facial processing, while the data obtained from optical systems and inertial systems are combined to aid in the body processing.

Figure 4A:
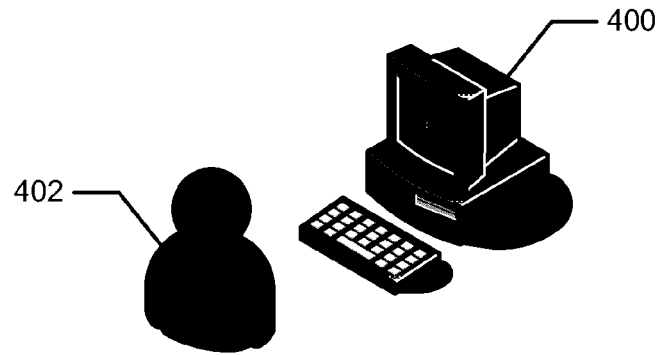
FIG. 4A illustrates a representation of a computer system and a user.

FIG. 4A illustrates a representation of a computer system 400 and a user 402. The user 402 uses the computer system 400 to combine multi-sensory inputs for digital animation. The computer system 400 stores and executes a combined motion capture system 490.

Figure 4B:
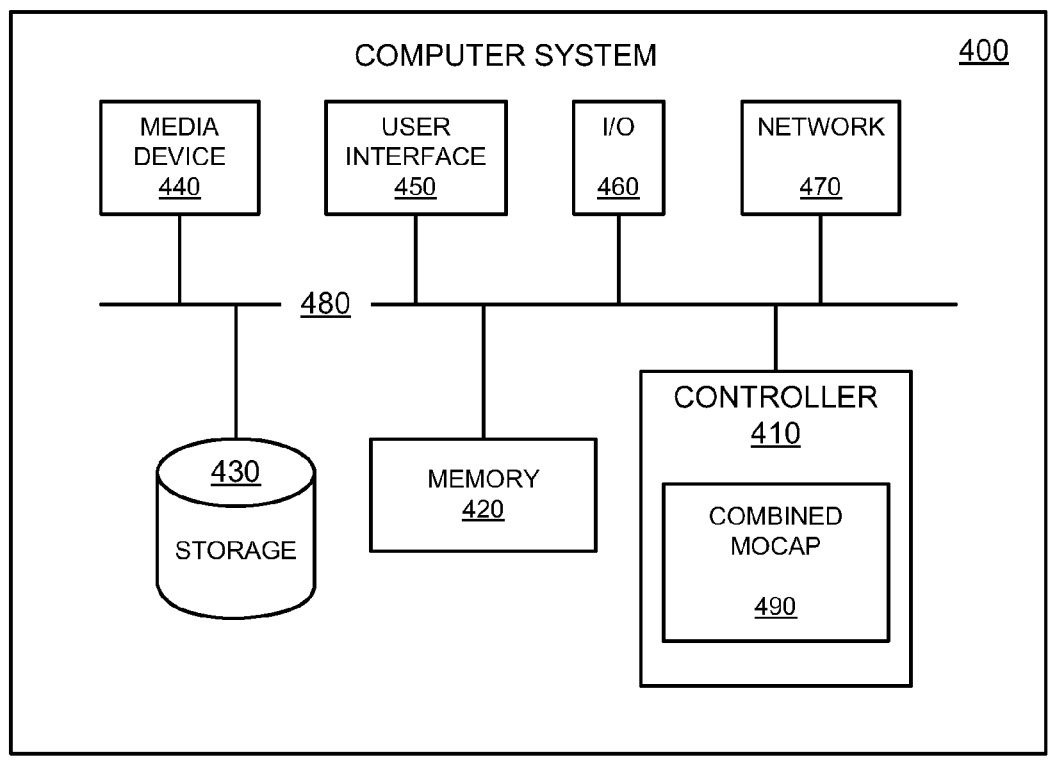
FIG. 4B is a functional block diagram illustrating the computer system hosting the combined motion capture system.

FIG. 4B is a functional block diagram illustrating the computer system 400 hosting the combined motion capture system 490. The controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the combined motion capture system 490 as a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data temporarily or long term for use by other components of the computer system 400, such as for storing data used by the combined motion capture system 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user. In one implementation, the user interface 450 includes a keyboard, a mouse, audio speakers, and a display. The controller 410 uses input from the user to adjust the operation of the computer system 400.

The I/O interface 460 includes one or more I/O ports to connect to corresponding I/O devices, such as external storage or supplemental devices (e.g., a printer or a PDA).

In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the digital representations can be used in combination with conventional video, such as to add a single digital character to a filmed scene or similarly to add an object or part of an object or character to a scene. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of animating digital characters based on motion captured performances, the method comprising:
   receiving sensory data collected using a variety of collection techniques including optical video, electro-oculography, optical, infrared, acoustic, and inertial motion capture of an actor,
   wherein the inertial motion capture is used to provide tracking of the actor relative to a root of the actor, while the optical and acoustic motion captures are combined with the inertial motion capture to provide the root of the actor;
   managing and combining the collected sensory data to aid cleaning, tracking, labeling, and re-targeting processes; and
   first combining 3-D points received from at least one of optical and infrared motion capture in a large capture volume and combining them with 2-D entities received from multiple video cameras in a low foot print capture volume.

2. The method of claim 1, wherein the inertial motion capture is performed to collect the sensory data when camera placements are difficult due to set constraints.

3. The method of claim 1, wherein managing and combining comprises
   second combining animation data received from the inertial motion capture with the reconstructed 3-D points and the 2-D entities.

4. The method of claim 1, wherein the first combining comprises
   defining the 3-D points as unlabeled points in a 3-D space that corresponds to movements of multiple actors in a capture volume.

5. The method of claim 1, further comprising:
   receiving an output of a range of motion movements; and
   using the range of motion movements to guide the cleaning, tracking, labeling, and re-targeting processes.

6. The method of claim 1, further comprising
   processing facial data in a gross stabilization process,
   wherein head markers are used to generate a transform to map facial markers to a neutral space.

7. The method of claim 1, further comprising
   processing body data obtained using self-identifying optical markers,
   wherein each optical marker is coded with a unique identifier.

8. The method of claim 7, further comprising
   calculating 2-D locations and orientations of the optical markers in each frame.

9. The method of claim 8, further comprising
   inputting the 2-D locations into a multi-camera inverse kinematics solver.

10. The method of claim 1, wherein managing and combining comprises
    obtaining 3-D body marker positions using kinematic labeling and cleaning.

11. The method of claim 1, wherein managing and combining comprises
    obtaining 3-D facial marker positions using stabilization of facial data.

12. The method of claim 1, wherein managing and combining comprises
    obtaining 3-D facial marker positions by selecting a best T-pose.

13. The method of claim 1, wherein managing and combining comprises
    obtaining 2-D facial marker positions using video-based facial animation solver.

14. The method of claim 1, further comprising
    generating animations for body and face.

15. A non-transitory storage medium storing a computer program, the computer program comprising:
    a labeling module;
    a tracking module;
    a cleaning module;
    a re-targeting module; and
    an input management module configured to receive sensory data collected using a variety of collection techniques including optical video, electro-oculography, optical, infrared, acoustic, and inertial motion capture,
    wherein the inertial motion capture is used to provide tracking of the actor relative to a root of the actor, while the optical and acoustic motion captures are combined with the inertial motion capture to provide the root of the actor,
    the input management module operating to manage and combine the received sensory data to produce outputs that guide the labeling module, the tracking module, the cleaning module, and the re-targeting module.

16. The non-transitory storage medium of claim 15, wherein the labeling module labels body markers.

17. A non-transitory tangible storage medium storing a computer program for animating digital characters based on motion captured performances, the computer program comprising executable instructions that cause a computer to:
    receive sensory data collected using a variety of collection techniques including optical video, electro-oculography, optical, infrared, acoustic, and inertial motion capture,
    wherein the inertial motion capture is used to provide tracking of the actor relative to a root of the actor, while the optical and acoustic motion captures are combined with the inertial motion capture to provide the root of the actor; and
    manage and combine the collected sensory data to aid cleaning, tracking, labeling, and re-targeting processes.

18. The non-transitory tangible storage medium of claim 17, wherein the inertial motion capture is performed to collect the sensory data when camera placements are difficult due to set constraints.

19. The non-transitory tangible storage medium of claim 17, further comprising executable instructions that cause a computer to:
    receive an output of a range of motion movements; and
    use the range of motion movements to guide the cleaning, tracking, labeling, and re-targeting processes.

* * * * *